United States Patent
Hsu et al.

(10) Patent No.: US 11,079,788 B2
(45) Date of Patent: Aug. 3, 2021

(54) TRIGGER DEVICE AND HANDHELD PISTOL GRIP USING THEREOF

(71) Applicant: PEGATRON CORPORATION, Taipei (TW)

(72) Inventors: Chih-Cheng Hsu, Taipei (TW); Chun-Ho Huang, Taipei (TW); Wei-Fan Chien, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 3 days.

(21) Appl. No.: 16/812,437

(22) Filed: Mar. 9, 2020

(65) Prior Publication Data

US 2020/0348711 A1 Nov. 5, 2020

(30) Foreign Application Priority Data

May 1, 2019 (TW) ................................. 108115177

(51) Int. Cl.
*G05G 1/04* (2006.01)
*G05G 5/05* (2006.01)
*G01D 5/14* (2006.01)

(52) U.S. Cl.
CPC ............... *G05G 1/04* (2013.01); *G01D 5/142* (2013.01); *G05G 5/05* (2013.01); *G05G 2505/00* (2013.01)

(58) Field of Classification Search
CPC .................................................. G05G 2505/00
See application file for complete search history.

(56) References Cited

U.S. PATENT DOCUMENTS

| 6,246,319 | B1 | 6/2001 | Hsu |
| 9,784,515 | B2* | 10/2017 | Haimi ................. F41C 33/0263 |
| 2016/0256185 | A1* | 9/2016 | Shelton, IV ......... A61B 17/068 |
| 2017/0083039 | A1* | 3/2017 | Wuisan .................... G05G 5/05 |

FOREIGN PATENT DOCUMENTS

TW 392655 U 6/2000

* cited by examiner

*Primary Examiner* — Vicky A Johnson
(74) *Attorney, Agent, or Firm* — McClure, Qualey & Rodack, LLP

(57) ABSTRACT

A trigger device is configured to trigger a Hall sensor located above the trigger device and the trigger device includes a body, a pressing member and a pushing member. The body includes a base, an elastic member and a shaft. The elastic member is disposed in the base and the shaft is pivotally connected to the base. The pressing member is pivotally connected to one end of the shaft. The pushing member is pivotally connected to the other end of the shaft, slidably disposed on the base and holds against the elastic member. When the pressing member is pressed, the pressing member pushes the shaft to rotate and push the pushing member to undergo a displacement so that a position of a magnetic member of the pushing member and a position of the Hall sensor overlap. And the pushing member squeezes the elastic member to generate an elastic restoring force.

10 Claims, 6 Drawing Sheets

TRIGGER DEVICE AND HANDHELD PISTOL GRIP USING THEREOF

CROSS-REFERENCE TO RELATED APPLICATION

This non-provisional application claims priority under 35 U.S.C. § 119(a) to Patent Application No. 108115177 filed in Taiwan, R.O.C. on May 1, 2019, the entire contents of which are hereby incorporated by reference.

BACKGROUND

Technical Field

The application relates to a trigger device, and in particular, to a trigger device capable of triggering a Hall sensor and a handheld pistol grip using the trigger device.

Related Art

In the prior art, a trigger device is applied to many products, such as a push-drive structure on a handheld barcode scanner pistol grip. In order to restore the trigger device to an unpressed state after being pressed, a spring arm structure is used on most products. The trigger device after pressing can return to an initial position before pressing through a spring force of the spring arm structure.

However, most trigger devices with a spring arm structure are assembled through clamping by two portions obtained by disassembling a single main body. In this manner, the trigger device can be fixed and can also be successfully rotated. However, there is an excessive segment gap after assembling, and the gap between the trigger and the main body is also difficult to control.

Moreover, the trigger device with a spring arm performs is to be rotated. If the trigger device is to trigger a Hall sensor, the trigger device is equipped with a magnet. However, because the trigger device is to be rotated, the magnet translates and rotates, resulting in more difficulty in obtaining a consistent Gaussian value of the magnet.

SUMMARY

In view of the above, an embodiment of the application provides a trigger device configured to trigger a Hall sensor located above the trigger device. The trigger device includes a body, a pressing member, and a pushing member. The body includes a base, an elastic member, and a shaft. The elastic member is disposed in the base, and the shaft is pivotally connected to the base. The pressing member is pivotally connected to one end of the shaft. The pushing member includes a magnetic member. The pushing member is pivotally connected to the other end of the shaft and is slidably disposed on the base, and the pushing member holds against the elastic member. When the pressing member is pressed, the pressing member pushes the shaft to rotate and push the pushing member to undergo a displacement, so that a position of the magnetic member and a position of the Hall sensor overlap. The pushing member squeezes the elastic member to generate an elastic restoring force.

Therefore, according to the body with an assembly structure, a strength of the trigger device can be enhanced, and a segment gap generated after assembling can be avoided. The shaft and the base are disposed to convert a rotary motion of the pressing member into a linear motion of the pushing member, so that the magnetic member can linearly in only one direction, thereby avoiding an inconsistent Gaussian value of magnet.

In some embodiments, the base of the trigger device includes a positioning column. The pushing member includes an holding portion. The elastic member is sleeved on the positioning column and holds against the base at one end, and the holding portion of the pushing member passes through the positioning column and correspondingly holds against the other end of the elastic member. The positioning column on which the elastic member (such as a spring) may be sleeved is disposed on the base of the body, so that the elastic member can be compressed or released at a specific position. In addition, since an elastic member such as a spring may be used, a required spring may be selected according to a required elastic force.

In some embodiments, the shaft includes a receiving slot. After the pressing member is pressed, the shaft is rotated so that the positioning column passes through the receiving slot. In this way, an interference problem that may occur when the shaft is rotated to the positioning column can be avoided.

In some embodiments, the base further may further include two assembly plates disposed on two sides of the positioning column and parallel to each other. The shaft includes two rotation shafts protruding toward left and right sides respectively, each of the rotation shafts being pivotally disposed on one of the assembly plates, and the shaft being disposed between the two assembly plates. Through clamping, the shaft can be pivoted in a specific space to reduce left and right offsets. During assembling using the assembly plate, the shaft may also be assembled with an elastic force of a material without a need to disassemble the assembly plate into two portions for clamping together.

In some embodiments, the base further may further include two assembly plates parallel to each other. The shaft includes two rotation shafts protruding toward left and right sides respectively, each of the rotation shafts being pivotally disposed on one of the assembly plates, and the shaft being disposed between the two assembly plates. Through clamping, the shaft can be pivoted in a specific space to reduce left and right offsets. During assembling using the assembly plate, the shaft may also be assembled with an elastic force of a material without a need to disassemble the assembly plate into two portions for clamping together.

In some embodiments, the base includes a pivoting slot and an opening. The pressing member includes a pivotal shaft, the pivotal shaft being assembled into the pivoting slot through the opening and being pivoted in the pivoting slot. During assembling of the pressing member in the pivoting slot through the pivotal shaft and the opening of the pivoting slot of the base, the pressing member can be assembled and positioned through mere simple assembling.

In some embodiments, a first groove and a second groove are respectively disposed on two ends of the shaft. The pressing member is pivotally connected to the first groove, and the pushing member is pivotally connected to the second groove. The pressing member and the pushing member are pivotally connected to the two ends of the shaft respectively, so that when the pressing member is to be rotated to push the shaft, a rotary motion of the pressing member can be converted into a linear motion used to push the pushing member to move.

In some embodiments, a magnetic member is disposed at one end of the pushing member. The other end of the pushing member has a crossbar pivotally disposed in the second groove. When the shaft is rotated, the second groove pushes the crossbar to move, so as to push the pushing member to undergo a displacement, so that a position of the magnetic member and a position of the Hall sensor overlap.

In some embodiments, the base includes two limiting slots, and the pushing member further includes two limiting members. The two limiting members pass through and slide in the two limiting slots. When the shaft is rotated, the second groove drives the crossbar pivotally disposed therein, to push against the pushing member, so that the pushing member is shifted along the limiting slots through the limiting members. Under limitation of the two limiting slots, the pushing member can be shifted in only one direction, so that the pushing member can be prevented from rotating under push of the shaft.

Another embodiment of the application provides a handheld pistol grip assembled to an electronic device having a Hall sensor. The handheld pistol grip includes a pistol grip body and the trigger device according to any of the foregoing embodiments. The pistol grip body includes a fixing portion and a handle. The handle extends downward from the fixing portion. The electronic device is assembled to the fixing portion. The trigger device is assembled to the handle and is located below the Hall sensor, and the magnetic piece is adjacent to the electronic device. Therefore, when the Hall sensor in the electronic device is to be driven, the pressing member of the trigger device may be pressed to further drive the pushing member to move, so that a position of the magnetic member and a position of the Hall sensor overlap, thereby driving the sensor.

In summary, according to the body with an assembly structure of the trigger device, a strength of the trigger device can be enhanced, and a segment gap generated after assembling can be avoided. The shaft and the base are disposed to convert a rotary motion of the pressing member into a linear motion of the pushing member, so that the magnetic member can linearly move in only one direction, thereby avoiding an inconsistent Gaussian value of magnet.

Detailed features and advantages of the application are described in detail in the following implementations, and the content of the implementations is sufficient for a person skilled in the art to understand and implement the technical content of the application. A person skilled in the art can easily understand the objectives and advantages related to the application according to the contents disclosed in this specification, the claims and the drawings.

DETAIL DESCRIPTION OF THE EMBODIMENTS

Figure 1:
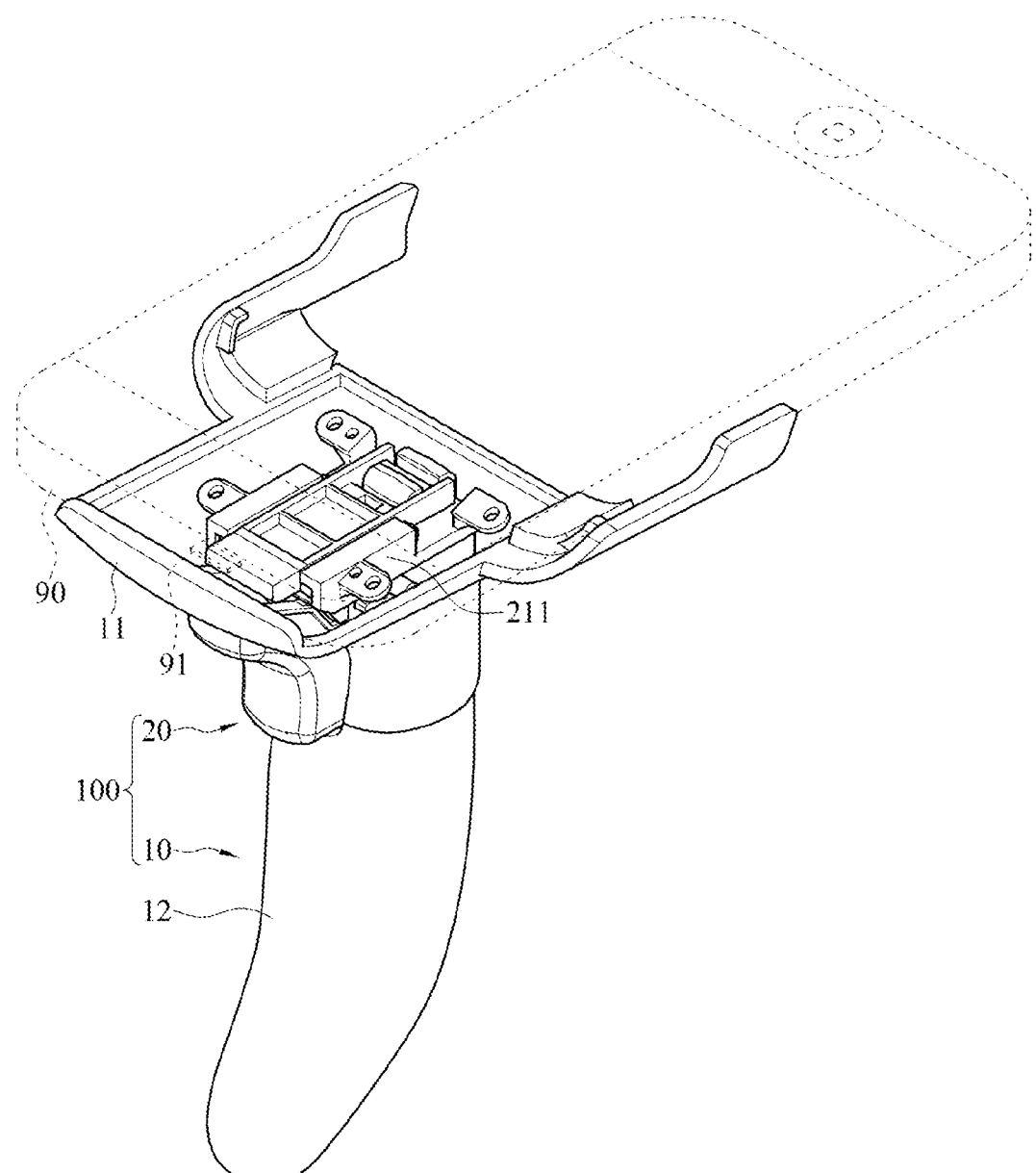
FIG. 1 is a perspective view of a handheld pistol grip according to an embodiment of the application.

Referring to FIG. 1 first, FIG. 1 is a perspective view of a handheld pistol grip according to an embodiment of the application. A handheld pistol grip 100 in this embodiment is assembled to an electronic device 90 having a Hall sensor 91. The electronic device 90 may be a mobile device, a mobile phone, a tablet, or a PDA, etc., and may be driven by the Hall sensor 91 to implement functions such as shooting, reading, or sensing, etc.

The handheld pistol grip 100 includes a pistol grip body 10 and a trigger device 20. The pistol grip body 10 includes a fixing portion 11 and a handle 12. The handle 12 extends downward from the fixing portion 11 to form a structure to be held by a user's hand. The electronic device 90 is assembled to the fixing portion 11. In this embodiment, a shape of the fixing portion 11 corresponds to a shape of the electronic device 90, so that the electronic device 90 may be fixed to the fixing portion 11. In other implementations, the fixing portion 11 may also be designed as a structure with a variable shape to be disposed on electronic devices of different sizes.

The trigger device 20 is assembled to the handle 12 and is located below the Hall sensor 91 of the electronic device 90. A magnetic member (not shown in FIG. 1 and described in detail below) of the trigger device 20 is adjacent to the electronic device 90. Therefore, when the Hall sensor 91 in the electronic device 90 is to be driven, the trigger device 20 may be pressed to further drive the magnetic member to move, so as to change a distance between the magnetic member and the Hall sensor 91 of the electronic device 90, so that a position of the magnetic member and a position of the Hall sensor 91 overlap, thereby driving the Hall sensor 91 in the electronic device 90. A structure of the trigger device 20 is described in further detail below.

Figure 2:
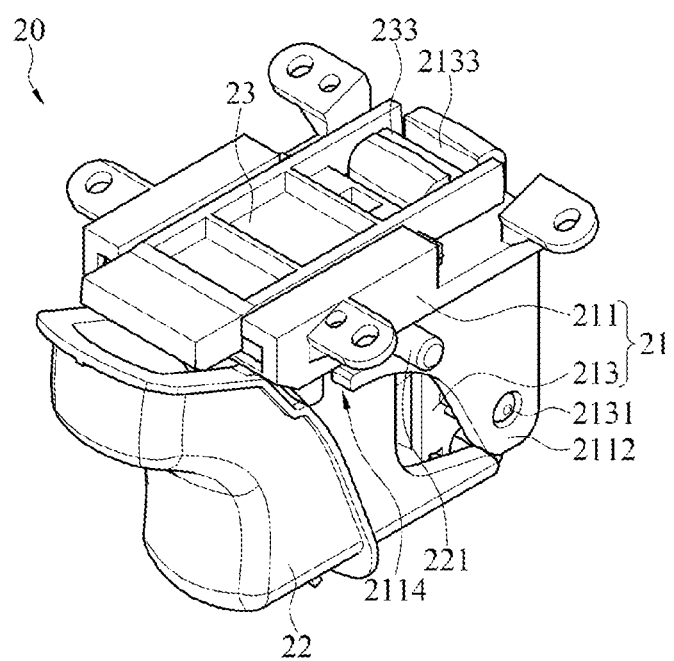
FIG. 2 is a perspective view of a trigger device according to an embodiment of the application.
Figure 3:
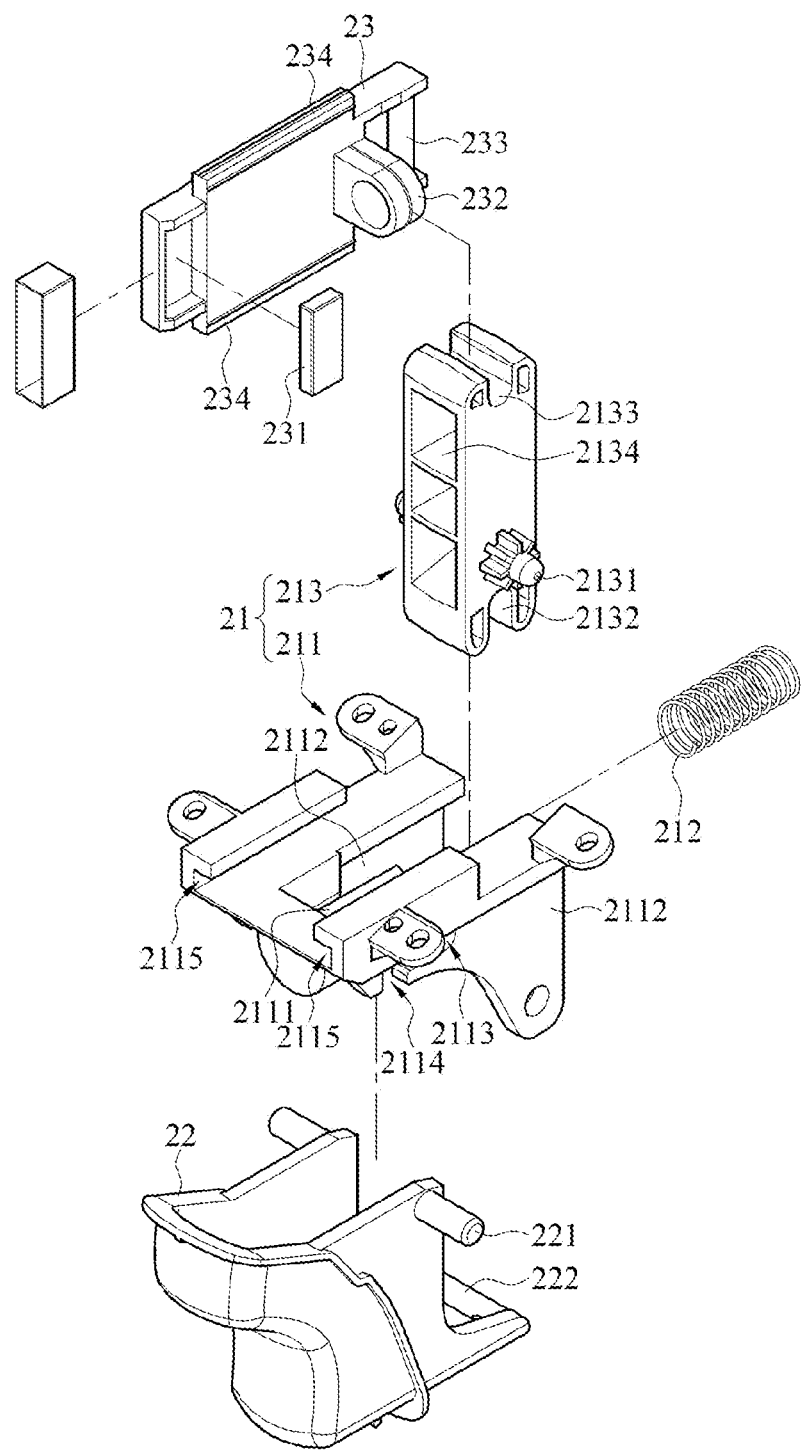
FIG. 3 is an exploded view of a trigger device according to an embodiment of the application.
Figure 4:
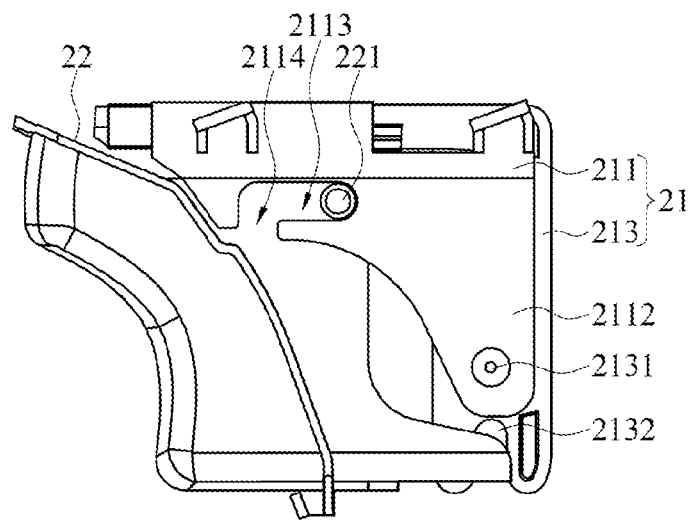
FIG. 4 is a side view of a trigger device according to an embodiment of the application.
Figure 5:
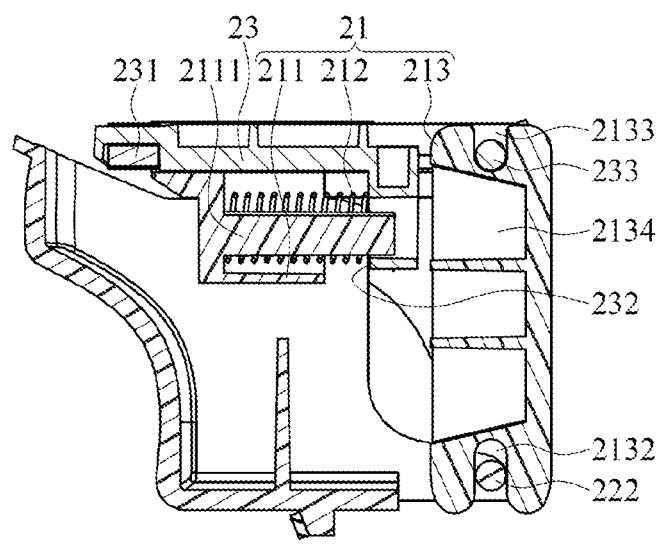
FIG. 5 is a cross-sectional view of a trigger device according to an embodiment of the application.
Figure 6:
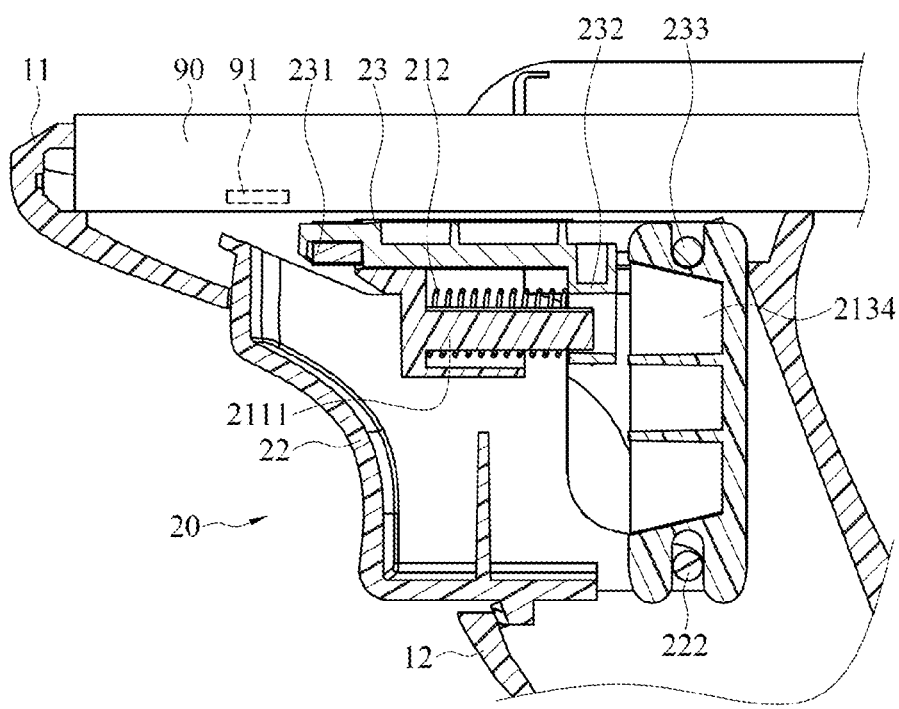
FIG. 6 is a cross-sectional view of a handheld pistol grip before pressing according to an embodiment of the application.
Figure 7:
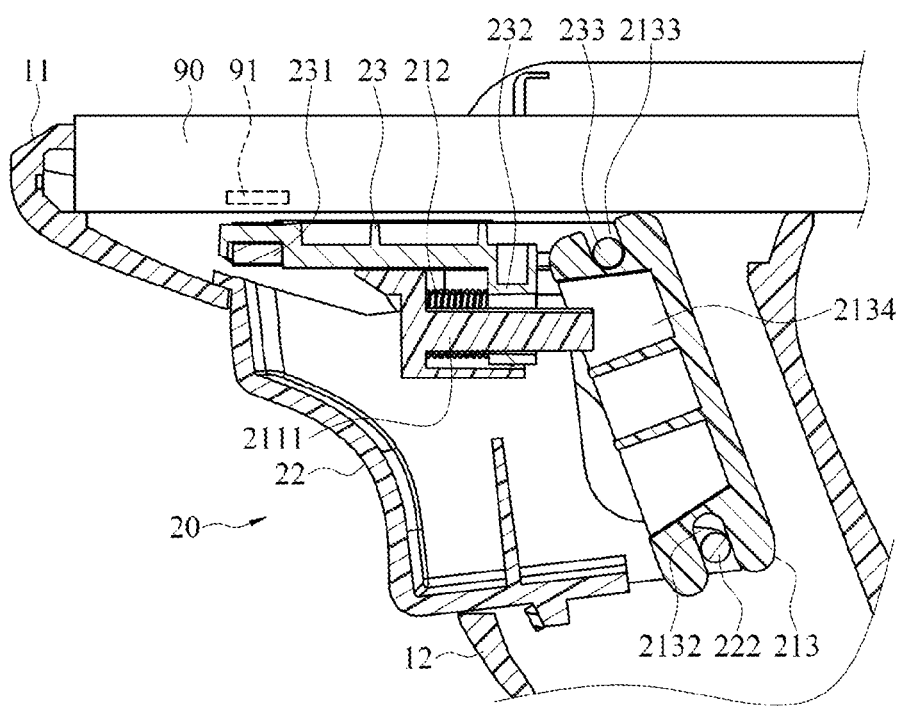
FIG. 7 is a cross-sectional view of a handheld pistol grip after pressing according to an embodiment of the application.

Next, the detailed structure and an operating manner of the trigger device are described with reference to FIG. 2 to FIG. 7. FIG. 2 is a perspective view of a trigger device according to an embodiment of the application. FIG. 3 is an exploded view of a trigger device according to an embodiment of the application. FIG. 4 is a side view of a trigger device according to an embodiment of the application. FIG. 5 is a cross-sectional view of a trigger device according to an embodiment of the application. FIG. 6 is a cross-sectional view of a handheld pistol grip before pressing according to an embodiment of the application. FIG. 7 is a cross-sectional view of a handheld pistol grip after pressing according to an embodiment of the application.

Referring to FIG. 2 to FIG. 5 first, a trigger device 20 in this embodiment includes a body 21, a pressing member 22, and a pushing member 23. The body 21 includes a base 211, an elastic member 212, and a shaft 213. During assembling of the trigger device 20 on the handle 12, the base 211 is locked on the handle 12 to fix the trigger device 20. It may be learned from FIG. 3 to FIG. 5 that an elastic member 212 is disposed in the base 211, and the shaft 213 is pivotally connected to the base 211. The pressing member 22 is pivotally connected to one end of the shaft 213. The pushing member 23 includes a magnetic member 231. The pushing member 23 is pivotally connected to the other end of the shaft 213 and is slidably disposed on the base 211. The pushing member 23 holds against the elastic member 212. It may be learned from FIG. 6 and FIG. 7 that, when the pressing member 22 is pressed, the pressing member 22 pushes the shaft 213 to rotate and push the pushing member 23 to undergo a displacement, so as to change a distance between the magnetic member 231 and the Hall sensor 91, so that a position of the magnetic member 231 and a position of the Hall sensor 91 overlap. In addition, the pushing member 23 squeezes the elastic member 212 to generate an elastic restoring force.

Therefore, according to the body 21 with an assembly structure, a strength of the trigger device 20 can be enhanced, and a segment gap generated after assembling of the trigger device 20 to the handle 12 can be avoided. The shaft 213 and the base 211 are disposed to convert a rotary motion of the pressing member 22 into a linear motion of the pushing member 23, so that the magnetic member 231 can linearly move in only one direction, thereby avoiding an inconsistent Gaussian value of magnet.

Each detailed structure is described in detail below. In this embodiment, it may be learned from FIG. 3 and FIG. 5 that, the base 211 includes a positioning column 2111, and the pushing member 23 includes an holding portion 232. In this embodiment, the positioning column 2111 is described using a solid cylinder as an example, and the positioning column 2111 is located at a center of a bottom side of the base 211 and extends in a front-to-rear direction. It may be learned from the cross-sectional view in FIG. 5 that, the elastic member 212 is sleeved on the positioning column 2111 and holds against the base 211 at one end (as shown in FIG. 5, a left end of the elastic member 212 holds against the base 211). Subsequently, after the elastic member 212 is mounted, the holding portion 232 of the pushing member 23 assembled to the base 211 passes through the positioning column 2111 and correspondingly holds against the other end of the elastic member 212 (as shown in FIG. 5, the holding portion 232 holds against a right end of the elastic member 212).

In this way, when the pushing member 23 is shifted leftward and rightward, which is shown in FIG. 6 and FIG. 7, the holding portion 232 exerts a force on the elastic member 212, so that the elastic member 212 generates an elastic restoring force through compression by the force (which is shown in FIG. 7). Alternatively, the holding portion 232 is pushed to an initial position with the elastic restoring force of the elastic member 212 (which is shown in FIG. 6). Furthermore, the positioning column 2111 on which the elastic member 212 (such as a spring) may be sleeved is disposed on the base 211 of the body 21, so that the elastic member 212 can be compressed or released at a specific position in a specific direction. In addition, since an elastic member 212 such as a spring may be used, a required spring may be selected according to a required elastic force.

Referring to both FIG. 6 and FIG. 7, the shaft 213 includes a receiving slot 2134. When the pressing member 22 is pressed, the shaft 213 is rotated to a position close to the positioning column 2111. In order to avoid an interference problem that may occur when the shaft 213 is rotated to the positioning column 2111, a receiving slot 2134 is disposed on the shaft 213, so that the shaft 213 may approach the positioning column 2111, and the positioning column 2111 may pass through the receiving slot 2134.

Referring to both FIG. 2 and FIG. 3 again, the base 211 may further include two assembly plates 2112 disposed on two sides of the positioning column 2111 and parallel to each other. The shaft 213 includes two rotation shafts 2131 protruding toward left and right sides respectively, each of the rotation shafts 2131 being pivotally disposed on one of the assembly plates 2112, and the shaft 213 being disposed between the two assembly plates 2112. Through clamping, the shaft 213 can be pivoted in a specific space to reduce left and right offsets. During assembling using the assembly plate 2112, the shaft 213 may also be assembled with an elastic force of a material without a need to disassemble the assembly plates 2112 on the left and right sides into two portions for clamping shaft 213 together.

Referring to FIG. 4 again, the base 211 further includes a pivoting slot 2113 and an opening 2114. The pressing member 22 includes a pivotal shaft 221. The pivotal shaft 221 is assembled into the pivoting slot 2113 through the opening 2114 and is pivoted in the pivoting slot 2113. During assembling of the pressing member 22 in the pivoting slot 2113 through the pivotal shaft 221 and the opening 2114 of the pivoting slot 2113 of the base 211, the pressing member 22 can be assembled and positioned through mere simple assembling. When the pressing member 22 is pressed to be rotated, which is shown in FIG. 6 and FIG. 7, the pressing member 22 is rotated in the pivoting slot 2113 using the pivotal shaft 221 as an axis.

Next, referring to FIG. 2 to FIG. 5, a first groove 2132 and a second groove 2133 are respectively disposed on two ends of the shaft 213. The first groove 2132 and the second groove 2133 are grooves on the two ends of the shaft 213 that are respectively recessed inward along a length side. The first groove 2132 is a groove recessed upward and the second groove 2133 is a groove recessed downward. The pressing member 22 is pivotally connected to the first groove 2132, and the pushing member 23 is pivotally connected to the second groove 2133. It may be learned from FIG. 3 and FIG. 5 that, the pressing member 22 has a crossbar 222. The cross bar 222 is pivotally disposed in the first groove 2132. Likewise, the pushing member 23 also has a crossbar 233 at an end away from the magnetic member 231 and adjacent to the shaft 213. The crossbar 233 is pivotally disposed in the second groove 2133.

Therefore, as shown in FIG. 6 and FIG. 7, the pressing member 22 and the pushing member 23 are pivotally connected to the two ends of the shaft 213 respectively. When the pressing member 22 is pressed to rotate using the pivotal shaft 221 as an axis to push the shaft 213 by the crossbar 222, the shaft 213 is rotated using the rotation axis 2131 as an axis (which is shown in FIG. 4). In this case, the second groove 2133 at the other end of the shaft 213 pushes the crossbar 233, so that the pushing member 23 is pushed leftward. Therefore, a rotary motion of the pressing member 22 may be converted into a linear motion of the pushing member 23 through the disposed shaft 213.

It may be clearly learned from FIG. 6 and FIG. 7 that, a magnetic member 231 is disposed at one end of the pushing member 23, and the other opposite end of the pushing member 23 is pivotally connected to the shaft 213. When the shaft 213 pushes the pushing member 23, the magnetic member 231 at the one end may be moved to change the distance between the magnetic member 231 and the Hall sensor 91, so that the position of the magnetic member 231 and the position of the Hall sensor 91 overlap, thereby driving the Hall sensor 91.

In addition, it may be learned from FIG. 2 and FIG. 3 that, the base 211 includes two limiting slots 2115, and the pushing member 23 further includes two limiting members 234. The two limiting members 234 pass through and slide in the two limiting slots 2115. Under limitation of the two limiting slots 2115, when the second groove 2133 pushes the crossbar 233 disposed therein under rotation of the shaft 213, the pushing member 23 may be shifted along the limiting slot 2115 in one direction through the limiting member 234, thereby preventing the pushing member 23 from rotating under push of the shaft 213.

In summary, according to the body 21 with an assembly structure of the trigger device 20, a strength of the trigger device 20 can be enhanced, and a segment gap generated after assembling of the trigger device 20 can be avoided. The shaft 213 and the base 211 are disposed to convert a rotary motion of the pressing member 22 into a linear motion of the pushing member 23, so that the magnetic member 231 can linearly move in only one direction, thereby avoiding an inconsistent Gaussian value of magnet.

Although the application has been described in considerable detail with reference to certain preferred embodiments thereof, the disclosure is not for limiting the scope of the application. Persons having ordinary skill in the art may make various modifications and changes without departing from the scope and spirit of the application. Therefore, the scope of the appended claims should not be limited to the description of the preferred embodiments described above.

What is claimed is:

1. A trigger device configured to trigger a Hall sensor located above the trigger device, the trigger device comprising:
   a body comprising a base, an elastic member, and a shaft, the elastic member being disposed in the base, and the shaft being pivotally connected to the base;
   a pressing member pivotally connected to one end of the shaft; and
   a pushing member comprising a magnetic member, the pushing member being pivotally connected to the other end of the shaft and slidably disposed on the base, and the pushing member holding against the elastic member, when the pressing member is pressed, the pressing member pushing the shaft to rotate and push the pushing member to create a displacement, so that a position of the magnetic member and a position of the Hall sensor overlap, and the pushing member compressing the elastic member to generate an elastic restoring force.

2. The trigger device according to claim 1, wherein the base comprises a positioning column, and the pushing member comprises an holding portion, the elastic member being sleeved on the positioning column and holding against the base at one end, and the holding portion of the pushing member passing through the positioning column and correspondingly holding against the other end of the elastic member.

3. The trigger device according to claim 2, wherein the shaft comprises a receiving slot, the shaft rotates so that the positioning column passes through the receiving slot after the pressing member is pressed.

4. The trigger device according to claim 2, wherein the base further comprises two assembly plates disposed on two sides of the positioning column and parallel to each other, and the shaft comprises two rotation shafts protruding toward left and right sides respectively, each of the rotation shafts being pivotally disposed on one of the assembly plates, and the shaft being disposed between the two assembly plates.

5. The trigger device according to claim 1, wherein the base further comprises two assembly plates parallel to each other, and the shaft comprises two rotation shafts protruding toward left and right sides respectively, each of the rotation shafts being pivotally disposed on one of the assembly plates, and the shaft being disposed between the two assembly plates.

6. The trigger device according to claim 1, wherein the base comprises a pivoting slot and an opening, and the pressing member comprises a pivotal shaft, the pivotal shaft being assembled into the pivoting slot through the opening and being pivoted in the pivoting slot.

7. The trigger device according to claim 1, wherein a first groove and a second groove are respectively disposed on two ends of the shaft, the pressing member being pivotally connected to the first groove, and the pushing member being pivotally connected to the second groove.

8. The trigger device according to claim 7, wherein the magnetic member is disposed at one end of the pushing member, and the other end of the pushing member has a crossbar pivotally disposed in the second groove.

9. The trigger device according to claim 8, wherein the base comprises two limiting slots, and the pushing member further comprises two limiting members, the two limiting members passing through and sliding in the two limiting slots, and when the shaft is rotated, the second groove pushing the crossbar pivotally disposed therein, to push against the pushing member, so that the pushing member is moved along the limiting slots through the limiting members to create the displacement.

10. A handheld pistol grip assembled to an electronic device having a Hall sensor, the handheld pistol grip comprising:
   a pistol grip body comprising a fixing portion and a handle, the handle extending downward from the fixing portion, and the electronic device being assembled to the fixing portion; and
   the trigger device according to claim 1, the trigger device being assembled to the handle and located below the Hall sensor, and the magnetic member being adjacent to the electronic device.

* * * * *